(No Model.)

F. STORCK.
DUMPING CART.

No. 338,802. Patented Mar. 30, 1886.

Attest
Aaron E. Moore
A. Metzger

Inventor
Frank Storck
by Carl Spengel his Atty.

UNITED STATES PATENT OFFICE.

FRANK STORCK, OF CINCINNATI, OHIO.

DUMPING-CART.

SPECIFICATION forming part of Letters Patent No. 338,802, dated March 30, 1886.

Application filed February 1, 1886. Serial No. 190,529. (No model.)

*To all whom it may concern:*

Be it known that I, FRANK STORCK, a citizen of the United States, residing at Cincinnati, Hamilton county, State of Ohio, have invented certain new and useful Improvements in Dumping-Carts, of which the following is a specification.

My invention relates to such carts or wagons in which the bed slides loosely upon the frame, and being tilted rearwardly for the purpose of emptying it.

My improvements consist in the construction of the wagon-bed and the device for tilting it, and their object is to simplify the dumping and unloading of the wagon. I attain these objects by the construction illustrated in the accompanying drawings, in which—

Figure 1:
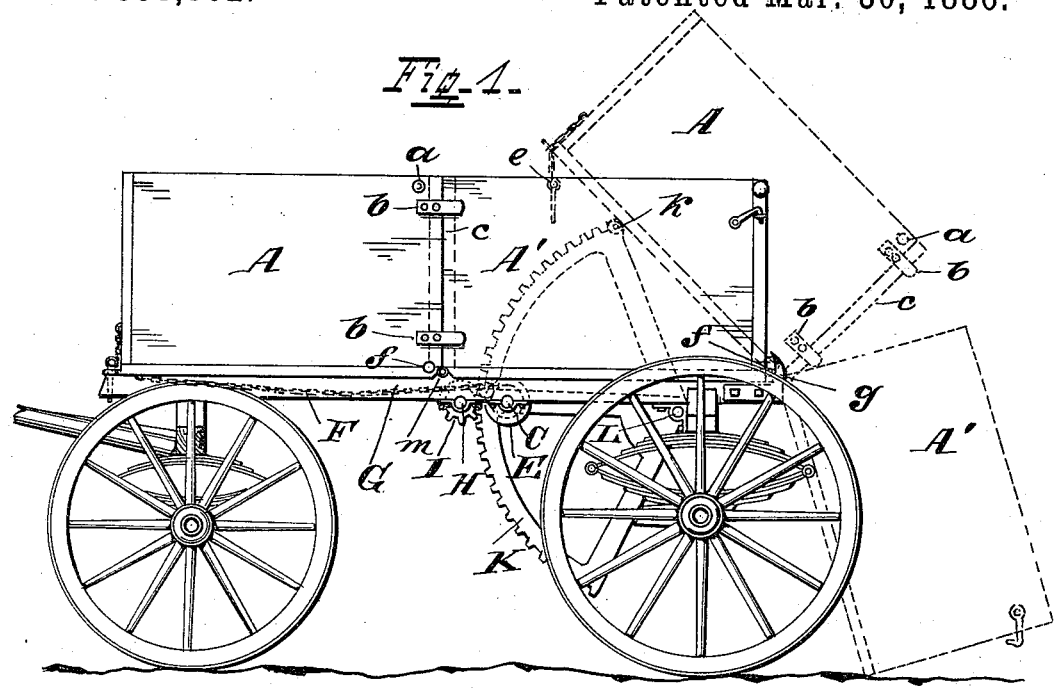
Figure 2:
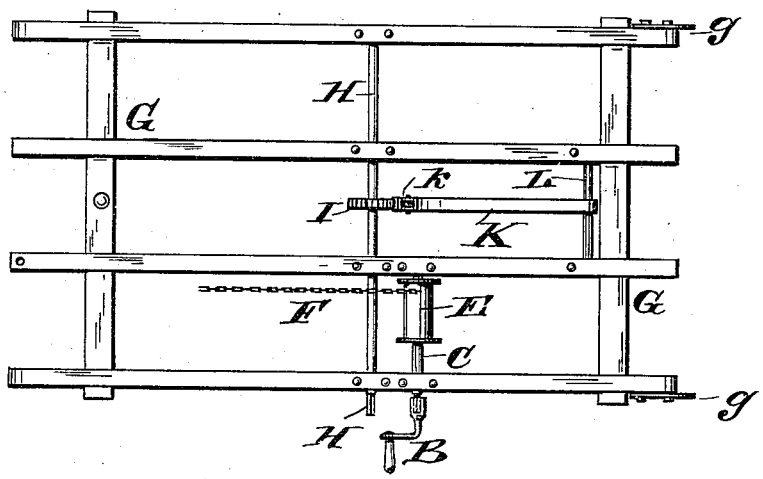

Figure 1 is a side view of my wagon or cart, showing the other position of the operative parts in dotted lines. Fig. 2 is a top view of the wagon-frame on which the bed rests, and showing the parts which operate said bed, (the running-gear being omitted.)

The wagon-bed consists in two sections, A A', of about equal length, and hinged together at their respective bottoms. Section A may have the usual tie-rod or chain at *a*, to keep the sides of the wagon from bulging out when loaded, and has further bolted to it two lugs, C, on each side, which perform the same function for the section A' as the chain or bolt at *a* does for A. Furthermore, flanges *c*, of light iron, are provided to cover the joints where the sections meet, to prevent leaking out of any portion of the load (grain, for instance,) and to keep the joining surfaces clean, so as not to interfere with their tight closing. Said flanges are secured to one section only. A being preferred in this case, and one reaching half of its width over the other section. Below the flange at the bottom of the bed the joints do not close tightly, but open out, as shown at *m*, Fig. 1, to admit the dropping out of any substances caught, and to prevent the straining of the hinges. A bolt, *e*, hung to a chain in front of the bed passes through a lug on it and a hole in the wagon-frame, on which the bed rests, to keep it in position, ordinarily, and is a device commonly used.

Proceeding to unload the wagon, the first part of this operation is done in the ordinary way. A crank-arm, B, is inserted in square end portion of shaft C, on which the flanged drum E sits. To this drum is fastened a chain, F, which reaches to the forward end of section A, and is fastened at the bottom there. By turning the crank, chain F winds itself upon the drum E, and pulls the whole wagon-bed with it. The rear section of the former will drop and unload itself as soon as the hinged center of the wagon-bed reaches the end of the supporting-frame G, when in the same time pins *f* on section A will have passed into hooks *g* on frame G, to prevent the front section from being pulled out too far or lifted from the frame by the dropping section A'.

The second and final operation for unloading the wagon consists in raising the remaining section of the wagon-bed sufficiently to allow the contents to slide out. (See Fig. 1.) For this purpose the crank-arm B is inserted in the square end portion of shaft H, which is journaled to the under side of frame G. This shaft carries a pinion, I, which engages in a segmental rack, K, which is pivoted to a shaft, L, also bolted to the frame G. It is obvious that on turning the crank in the required direction, the pinion I will raise the rack K and section A of the wagon-bed, while the latter is held in place and kept from sliding off by pins *f* and hooks *g*. A small roller, *k*, may be provided at the upper end of the segmental rack to lessen the friction, and a stop extending forward from the rear axle or axle-bed to prevent the segmental rack from dropping down too far and out of gear with pinion I.

Among the main advantages which I claim for this construction, are simplicity, and consequently cheapness, combined with great efficiency. The more gradual unloading of the wagon saves to the whole structure that sudden jar connected with the unloading of other dumping-carts and which is so wearing to their construction. Furthermore, especially when used for dumping coal, it is not necessary to pull the wagon way out in the street to complete the emptying and clearing of the wagon-bed, and the load is not so scattered in a long pile.

I am well aware of the many differently-constructed dumping-carts, and therefore do not claim my present invention, broadly; but What I do claim and desire to cover by Letters Patent, is as follows:

1. In a dumping-cart, the wagon-bed consisting of two sections, A A', hinged together at their bottom, and provided with lugs C, pins $f$, and flanges $c$, for the purposes described.

2. In a dumping-cart, the frame G, being provided with a shaft, H, having a square end and pinion I, the latter being in mesh with segmental rack K, having friction-roller $k$, and being pivoted to shaft L, secured to frame G, and hooks $g$, bolted to the end of the frame G.

3. In a dumping-cart, the combination of a sectional bed, A A', hinged together, and pins $f$, with shaft H, pinion I, rack K, and hooks $g$, all secured to the frame G.

In testimony of which invention I hereunto set my hand.

FRANK STORCK.

Witnesses:
 AARON E. MOORE,
 CARL SPENGEL.